Jan. 14, 1958 R. M. M. OBERMAN ET AL 2,820,102

IDENTIFICATION EQUIPMENT

Filed Oct. 14, 1953 3 Sheets-Sheet 1

INVENTORS:
ROELOF MAARTEN MARIE
OBERMAN AND ANTONIE SNIJDERS
BY
Michael S. Striker
agt.

IDENTIFICATION EQUIPMENT

Filed Oct. 14, 1953 3 Sheets-Sheet 2

INVENTORS:
ROELOF MAARTEN MARIE OBERMAN
AND ANTONIE SNIJDERS
BY
Michael S. Striker
agt.

INVENTORS:
ROELOF MAARTEN MARIE OBERMAN
AND ANTONIE SNIJDERS
BY
Michael S. Striker
Agt.

United States Patent Office 2,820,102

Patented Jan. 14, 1958

2,820,102

IDENTIFICATION EQUIPMENT

Roelof Maarten Marie Oberman, Voorburg, and Antonie Snijders, The Hague, Netherlands, assignors to de Staat der Nederlanden, Ten Deze Vertegenwoordigd Door de Directeur-Generaal der Posterijen, Telegrafie en Telefonie, The Hague, Netherlands Application October 14, 1953, Serial No. 386,087

Claims priority, application Netherlands October 21, 1952

5 Claims. (Cl. 179—18)

The invention relates to arrangements in an automatic exchange for determining to which of a plurality of service classes a desired connection between two subscribers belongs.

An arrangement of this kind, exclusively working with relays is known from the U. S. patent application Serial No. 130,394. Such arrangements have the disadvantage that effecting the identification proper requires some time. As in an exchange only one identification equipment is needed, it is necessary to reduce its occupation time for effecting an identification to a strict minimum. Viewed from that angle an all-relay arrangement of the identification equipment causes difficulties. Further an identification equipment according to the said specification has the drawback that the cross-connecting panels used must still be completed with rectifiers which should be able to carry rather strong relay currents, in order to avoid undesired couplings.

In the identification equipment according to the invention these disadvantages are done away with by the use of a network of resistors, which is so connected that each group to be marked at the calling side is connected via two resistors to each group to be marked at the called side of the automatic system, which gives rise to $n^2$ connecting points of pairs of resistors, if the numbers of groups at both of the said sides of the signalling system are equal, which will usually be the case, each of the $n^2$ connecting points being connected via a resistor to a pole of the voltage source and via a discoupling rectifier to a group marking terminal of the identification equipment. The group marking terminals which mark a group of subscribers with respect to another (or the same) group are connected via discoupling rectifiers to output terminals of the identification equipment which correspond to specific properties, as e. g. through-connection not allowed, free call, etc.

The invention will be explained in detail in connection with the annexed drawings, which represent the identification equipment and the adjacent part of the signalling system as far as is necessary for the explanation.

Figure 4:
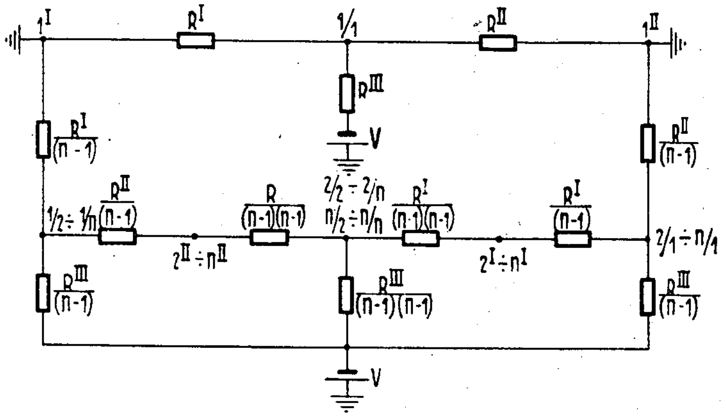
Figure 5:
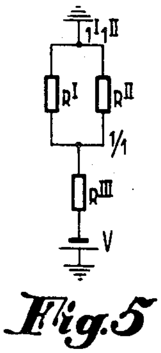
Figure 6:
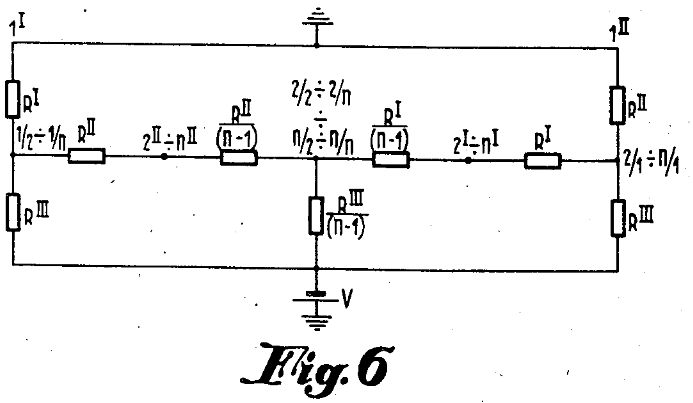

Figs. 4, 5 and 6 serve for the augmentation of the usefulness of the network with large numbers of participating groups.

Figure 1:
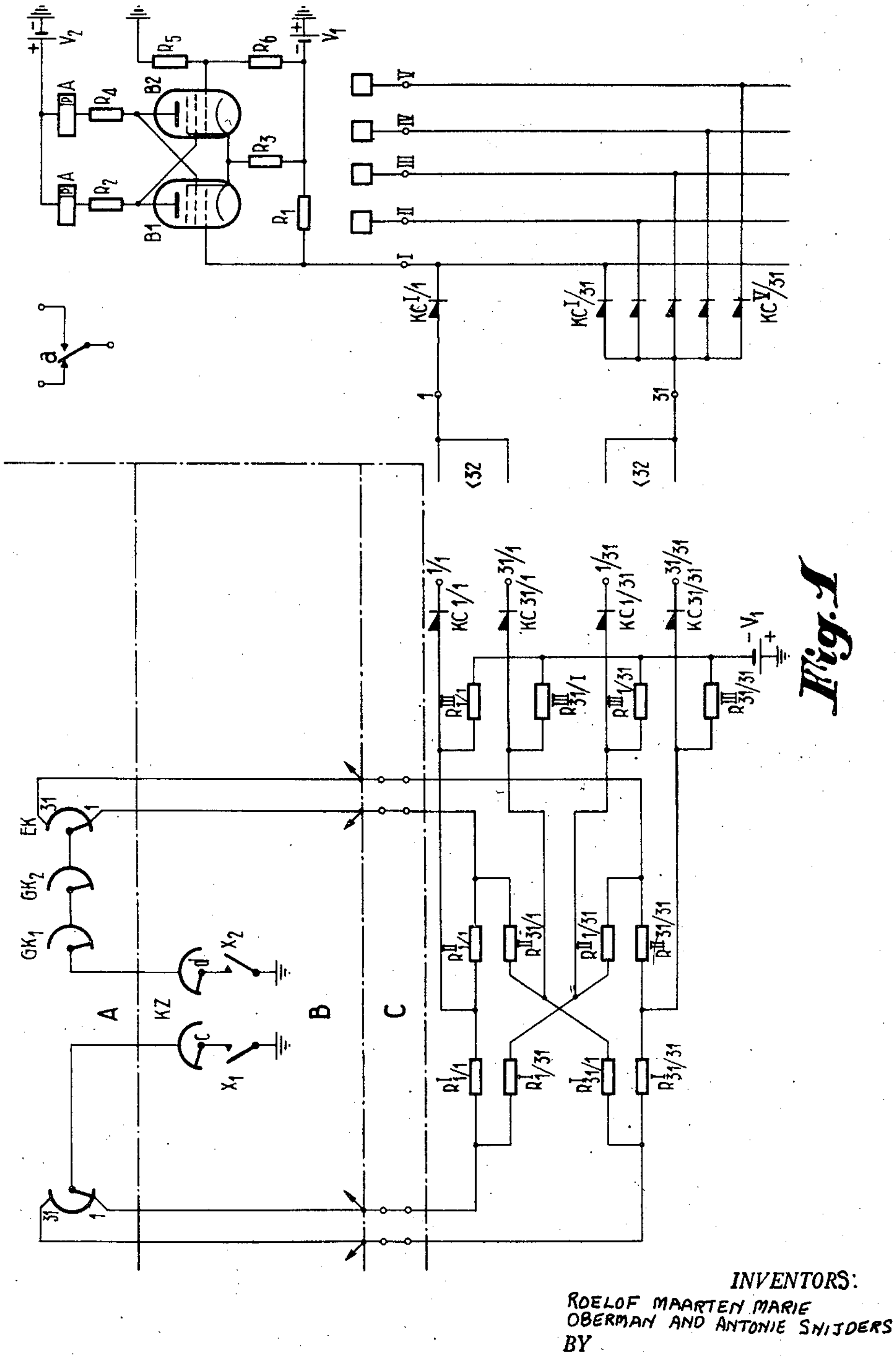
Fig. 1 shows the elementary wiring diagram for 31 participating groups.

In Fig. 1 part A belongs to the exchange, part B more particularly to the director, part C to the distributing frames and the remaining parts to the identification circuit proper. The figure represents the signalling system in a very diagrammatic way by means of arches of a line finder OZ, of a first group selector $GK_1$, of a second group selector $GK_2$ and of a final selector EK. These selectors may be positioned by any known system. As this matter is not directly connected with the invention, the selectors may also be replaced by crossbar switches arranged in systems in which there are no line finders, groups selectors or final selectors according to the notions obtaining with selectors having moving wipers. This summary designation of the automatic switching system serves to point out that at the moment when the last selecting stage has been positioned, the director should dispose of a wire running from this director via a wiper of the so-called cord finder (KZ, wires *c* and *d* or no matter which connecting member in the relevant system is used for this purpose) and then via a wiper of one or more calling switching stages (OZ) and one or more group selecting stages ($GK_1$ and $GK_2$) and a final selecting stage (EK), and via jumper connections to the calling subscriber's side and the called subscriber's side, respectively, of the identification equipment. In the example the identification equipment can mutually identify 31 groups. This number is not tied to limits in the identification equipment according to the inventon. Consequently, the calling side of the identification equipment according to the example has 31 connecting points at one end and 31 connecting points at the other end. The connecting points of the two groups are connected inter se by two resistors connected in series, which in the present embodiment have equal values, though this is not essential. So, if the number of groups is *n*, the arrangement contains $2n^2$ of these resistors ($R_{1/1}^{I}$, $R_{1/1}^{II}$ to $R_{31/31}^{I}$, $R_{31/31}^{II}$). The $n^2$ connecting points of these pairs of resistors are each connected via a separate resistor ($R_{1/1}^{III}$ to $R_{31/31}^{III}$ to a pole of the voltage source; if desired, this voltage source may be that of the automatic signalling system. Further the connecting points of these trios of resistors ($R_{1/1}^{I}$, $R_{1/1}^{II}$ and $R_{1/1}^{III}$, etc.) are each connected via a separate rectifier ($KC_{1/1}$, etc.) to a group marking terminal; these terminals may be designated by the number 1/1 to 31/31.

If the establishment of the connection has so far advanced that the identification must be effected, the director calls, in a manner not described here, but well-known, the identification equipment which, if it is free, connects itself to that director. The director connects the other pole of the said voltage source (earth) via contacts $x_1$ and $x_2$ to the said wires, which run through the automatic switching system and a distributing frame to the two inputs of the identification equipment, respectively. As an identification equipment can only effect the identification for one connection at a time, only one terminal of the $n(31)$ input terminals at the left of the figure and the $n(31)$ input terminals at the right of the figure (so those which are reached via a line finder and via a final selector, respectively), is connected to a pole of the voltage source, in this case earth.

If the identification equipment does not operate, all the connecting points of the trios of resistors bear the potential of the negative pole of the battery, which is connected to all resistors $R^{III}$. If the identification equipment operates, only the connecting point of the resistors connecting the two group marking terminals bears a certain potential which will be called potential of recognition further, whereas the connecting points of the pairs of resistors which are earthed at one side only bear a more negative potential and the connecting points of the pairs of resistors the group marking terminals of which are not earthed assume a still more negative potential. Consequently, when the identification device operates only one of the $n^2$ points assumes the potential of recognition.

For practical use of the identification equipment according to the invention the potential difference between the least negative group of connecting points of resistor trios and the potential of recognition should be sufficiently large to admit of being detected. The network according to the invention has the particularity that this potential difference increases as the number of groups $n$ increases.

Figure 2:
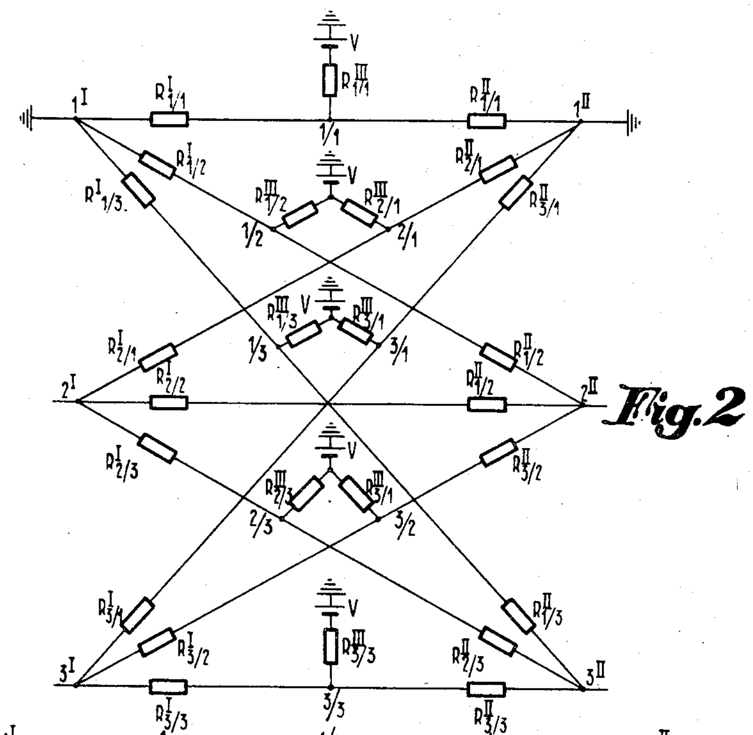
Fig. 2 shows the principle for 3 participating groups.

Fig. 2 shows the resistor arrangement in the case of $n=3$. The connecting points of the groups of 3 resistors provide the voltages for the rectifiers, which are not shown in this diagram.

The potentials of these connecting points will be considered for the case of one point on each side being connected to earth ($1^{I}$ and $1^{II}$). From this case an equivalent circuit will be derived, which enables us to calculate the potentials for the general case, from which it can be shown that the differences between the potential of the selected connecting point and the adjacent other connecting point potentials become greater as $n$ increases.

It results from considerations of symmetry that in Fig. 2:

(1) The potentials of points $2^{I}$ and $3^{I}$ are equal;
(2) The potentials of points $2^{II}$ and $3^{II}$ are equal;
(3) The potentials of points 1/2 and 1/3 are equal;
(4) The potentials of points 2/1 and 3/1 are equal;
(5) The potentials of points 2/2, 2/3, 3/2 and 3/3 are equal.

Figure 3:
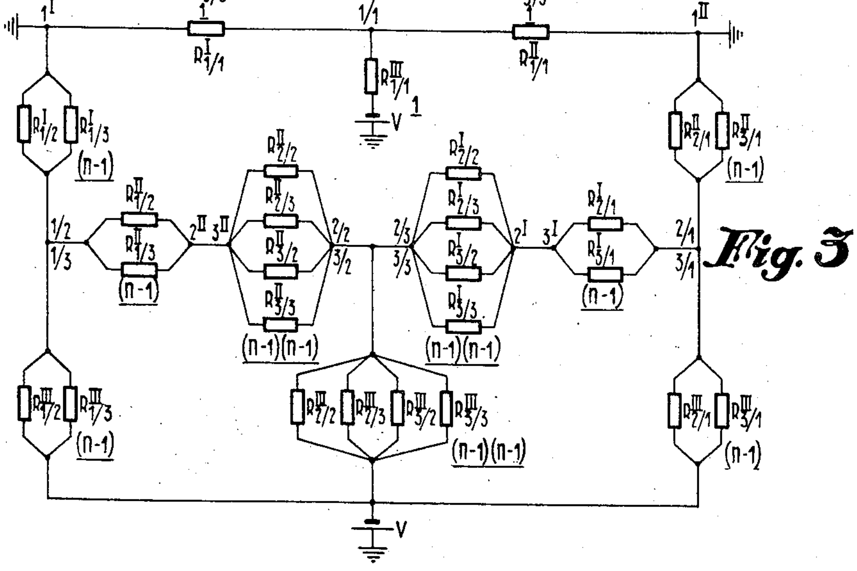
Fig. 3 shows a modification of the diagram according to Fig. 2.

If the points having equal potentials are connected to each other the diagram will be as shown in Fig. 3. This diagram contains also underlined indications of the numbers of resistors to be connected in parallel in the general case of $n$ points at the right and at the left.

For calculating the potentials of the various connecting points the equivalent circuit shown in Fig. 4 can be used. This diagram can still be split up into two diagrams given in Fig. 5 and Fig. 6. The potential of the selected connecting point 1/1 can be calculated from Fig. 5; this potential is independent of $n$.

In the diagram of Fig. 6, from which the potentials of the other connecting points can be calculated, the resistance values have been multiplied by $(n-1)$ for reasons of simplicity. In Fig. 6 the connecting points having the highest potential are points 1/2 . . . 1/$n$ or/and points 2/1 . . . $n$/1. The connecting points 2/2 . . . $n/n$ bear a potential which is lower than the highest potential of points 1/2 . . . 1/$n$ and 2/1 . . . $n$/1.

So in the further description only the connecting points 1/2 . . . 1/$n$ and 2/1 . . . $n$/1 are of importance. The potentials of these connecting points are lower than the potential of the selected connecting point 1/1, because the connecting point 1/1 is formed by the resistors $R^{I}$ and $R^{II}$ in series and the resistor $R^{III}$ and because with the other connecting points the resistors $R^{I}$ and $R^{II}$ are not fully in parallel.

The potentials of the connecting points 1/2 . . . 1/$n$ and 2/1 . . . $n$/1 will be lower as $n$ increases, since if $n$ increases, the resistors $$\frac{R^{II}}{(n-1)}$$

$$\frac{R^{I}}{(n-1)}$$

and $$\frac{R^{III}}{(n-1)}$$

will be smaller and tend to zero as $n$ tends to infinity, so that for points 1/2 . . . 1/$n$ $R^{II}$ is in parallel to $R^{III}$ and for points 2/1 . . . $n$/1 $R^{I}$ is in parallel to $R^{III}$. So the potential differences between the selected point 1/1 and the other connecting points increase as a result of the decrease of the potentials of these other connecting points as $n$ increases.

If it is desired e. g. to have the possibility of establishing five properties of the 31 different groups in their mutual relations, all the $n^2$ group marking terminals of a fully built-out network must be connected by means of a suitable combination of rectifiers (in which the presence or absence of one or more rectifiers—groups K 1/1 to K 1/31—indicates whether the revelant property is desired or not) to the reading device. As 5 ($m$) properties have been provided, there are only $2^5$ ($2m$) different possibilities which requires only 31 combinations of rectifiers, KC 1/1 to KC 1/31, because the 32nd combination needs no rectifiers. In the example there are $31^2$ ($n^2$) group marking terminals. It entails a considerable economy of rectifiers to connect through the group marking terminals intended to indicate the same combination of desired properties, and to connect this combination again to the desired group of rectifiers KC 1/1 to KC 1/31.

For practical reasons the number of rectifiers to be connected in parallel in the group KC 1/1 to KC 31/31 should not be taken larger than e. g. 32. If e. g. 96 of the group marking terminals are to be connected through there must be formed 3 groups each comprising 32 through-connected terminals, which may only be coupled if a rectifier of the same direction of conductivity as the first one is inserted.

The combination of potentials of recognition thus obtained at the $m$ output terminals ($m=5$ in the example) can cause the operation of a number of preferably electronic reading devices, located in the identification equipment itself or in the director. Double tubes connected as triggers are to be preferred for this purpose, but it is also possible to obtain good results with single tubes. The reading device shown in the example and which is connected to output terminal I may consist of two pentodes or of a double pentode connected as a trigger by the cross-connections of anodes and screen grids. Any other trigger circuit can be used for this purpose. A polarized relay having two windings is inserted in the anode circuits of the two tubes, so that by means of a contact other relay circuits can be controlled.

The factor $m$ is approximately equal to $\log_2 n$. In Fig. 1 one of the triggers (the one connected to conductor I) is shown in full, the other four as blocks.

While we have illustrated and described what we regard to be the preferred embodiment of our invention, nevertheless it will be understood that such is merely exemplary and that numerous modifications and rearrangements may be made therein without departing from the essence of the invention, we claim:

1. Apparatus for use in an automatic exchange for determining in which service class a desired connection between a calling and a called subscriber belongs comprising, in combination, a first plurality of input terminals, a calling appearance in the automatic exchange switches being coupled to one of said first plurality of input terminals; a second plurality of input terminals, a called appearance in the automatic exchange switches being coupled to one of said second plurality of input terminals; a plurality of pairs of series resistors having junction points, each of said input terminals of said first plurality being connected to each of said input terminals of said second plurality through a different pair of said series resistor; a battery having a first and a second pole, said junction point of said resistors being connected to one pole of said battery; a plurality of group marking terminals; a plurality of decoupling rectifiers, each of said decoupling rectifiers being connected respectively between one of said junction points and one of said group marking terminals; means for connecting the second pole of said battery through the automatic exchange to said two input terminals to which said calling and called appearances are respectively applied; a plurality of output terminals; a plurality of electrical connections between said output terminals and said group marking terminals; and a plurality of discriminating switching means, each of said plurality of discriminating switching means being connected respectively to one of said output terminals, each of said discriminating switching means being responsive to potentials appearing on its respective output terminal for determining the service class to which the desired connection belongs.

2. Apparatus for use in an automatic exchange for determining in which service class a desired connection between a calling and a called subscriber belongs comprising, in combination, a first plurality of input terminals, a calling appearance in the automatic exchange switches being coupled to one of said first plurality of input terminals; a second plurality of input terminals, a called appearance in the automatic exchange switches being coupled to one of said second plurality of input terminals; a plurality of pairs of series resistors having junction points, each of said input terminals of said first plurality being connected to each of said input terminals of said second plurality through a different pair of said series resistors; a battery having a first and a second pole; a third plurality of resistors, each resistor of said third plurality being connected respectively between said junction points of said series resistors and one pole of said battery; a plurality of group marking terminals; a plurality of decoupling rectifiers, each of said decoupling rectifiers being connected respectively between one of said junction points and one of said group marking terminals; means for connecting the second pole of said battery through the automatic exchange to said two input terminals to which said calling and called appearances are respectively applied; a plurality of output terminals; a plurality of electrical connections between said output terminals and said group marking terminals; and a plurality of discriminating switching means, each of said plurality of discriminating switching means being connected respectively to one of said output terminals, each of said discriminating switching means being responsive to potentials appearing on its respective output terminal for determining the service class to which the desired connection belongs.

3. Apparatus for use in an automatic exchange for determining in which service class a desired connection between a calling and a called subscriber belongs comprising, in combination, a first plurality of input terminals, a calling appearance in the automatic exchange switches being coupled to one of said first plurality of input terminals; a second plurality of input terminals, a called appearance in the automatic exchange switches being coupled to one of said second plurality of input terminals; a plurality of pairs of series resistors having junction points, each of said input terminals of said first plurality being connected to each of said input terminals of said second plurality through a different pair of said series resistors; a battery having a first and a second pole, said junction point of said resistors being connected to one pole of said battery; a plurality of group marking terminals; a plurality of decoupling rectifiers, each of said decoupling rectifiers being connected respectively between one of said junction points and one of said group marking terminals; means for connecting the second pole of said battery through the automatic exchange to said two input terminals to which said calling and called appearances are respectively applied; a plurality of output terminals; a plurality of electrical connections between said output terminals and said group marking terminals; and a plurality of discriminating trigger-tube switching means, each of said plurality of discriminating trigger-tube switching means being connected respectively to one of said output terminals, each of said discriminating trigger-tube switching means being responsive to potentials appearing on its respective output terminal for determining the service class to which the desired connection belongs.

4. Apparatus for use in an automatic exchange for determining in which service class a desired connection between a calling and a called subscriber belongs comprising, in combination, a first plurality of input terminals, a calling appearance in the automatic exchange switches being coupled to one of said first plurality of input terminals; a second plurality of input terminals, a called appearance in the automatic exchange switches being coupled to one of said second plurality of input terminals; a plurality of pairs of series resistors having junction points, each of said input terminals of said first plurality being connected to each of said input terminals of said second plurality through a different pair of said series resistors; a battery having a first and a second pole; a third plurality of resistors, each resistor of said third plurality being connected respectively between said junction points of said series resistors and one pole of said battery; a plurality of group marking terminals; a plurality of decoupling rectifiers, each of said decoupling rectifiers being connected respectively between one of said junction points and one of said group marking terminals; means for connecting the second pole of said battery through the automatic exchange to said two input terminals to which said calling and called appearances are respectively applied; a plurality of output terminals; a plurality of electrical connections between said output terminals and said group marking terminals; and a plurality of discriminating trigger-tube switching means, each of said plurality of discriminating trigger-tube switching means being connected respectively to one of said output terminals, each of said discriminating trigger-tube switching means being responsive to potentials appearing on its respective output terminal for determining the service class to which the desired connection belongs.

5. Apparatus for use in an automatic exchange for determining in which service class a desired connection between a calling and a called subscriber belongs comprising, in combination, a first plurality of input terminals, the number of said first plurality of input terminals totalling $n$, a calling appearance in the automatic exchange switches being coupled to one of said first plurality of input terminals; a second plurality of input terminals, the number of said second plurality of input terminals totalling $n$, a called appearance in the automatic exchange switches being coupled to one of said second plurality of input terminals; a plurality of pairs of series resistors having junction points, the number of said plurality of pairs of series resistors totalling $n^2$, each of said input terminals of said first plurality being connected to each of said input terminals of said second plurality through a different pair of said series resistors; a battery having a first and a second pole, said junction point of said resistors being connected to one pole of said battery; a plurality of group marking terminals; a plurality of decoupling rectifiers, each of said decoupling rectifiers being connected respectively between one of said junction points and one of said group marking terminals; means for connecting the second pole of said battery through the automatic exchange to said two input terminals to which said calling and called appearances are respectively applied; a plurality of output terminals; a plurality of electrical connections between said output terminals and said group marking terminals; and a plurality of discriminating switching means each of said plurality of discriminating switching means being connected respectively to one of said output terminals, each of said discriminating switching means being responsive to potentials appearing on its respective output terminal for determining the service class to which the desired connection belongs.

References Cited in the file of this patent

UNITED STATES PATENTS

| | | |
|---|---|---|
| 2,562,717 | Holden | July 31, 1951 |
| 2,600,502 | Holden | June 17, 1952 |
| 2,672,515 | Barlow | Mar. 16, 1954 |
| 2,672,518 | Holden et al. | Mar. 16, 1954 |